United States Patent

[11] 3,582,794

[72] Inventor Wayne A. Smith
Russiaville, Ind.

[21] Appl. No. 776,326
[22] Filed Nov. 18, 1968
[45] Patented June 1, 1971
[73] Assignee General Motors Corporation
Detroit, Mich.

[54] FM SIGNAL SEEKER FOR STEREO
2 Claims, 3 Drawing Figs.

[52] U.S. Cl. .......... 325/471, 325/470, 179/15
[51] Int. Cl. .......... H04b 1/32
[50] Field of Search .......... 179/15ST; 325/468, 469, 470, 471; 334/20, 28

[56] References Cited

UNITED STATES PATENTS 2,652,486 9/1953 Guyton .......... 325/470
3,334,187 8/1967 Pampel .......... 179/15ST

*Primary Examiner*—Robert L. Griffin
*Assistant Examiner*—Albert J. Mayer
*Attorneys*—E. W. Christen, C. R. Meland and Albert F. Duke

ABSTRACT: A circuit to permit an FM radio receiver equipped for stereo reception and having a search mechanism for scanning the FM band to respond only to stereo broadcasts. The detector signal and pilot signal are combined to operate a search latch mechanism only when both are present.

INVENTOR.
BY Wayne A. Smith
Thomas N. Young
ATTORNEY

FM SIGNAL SEEKER FOR STEREO

SUMMARY OF THE INVENTION

This invention relates to circuitry for permitting an FM radio receiver search mechanism of the stop-on-station type to respond only to FM stereo broadcasts.

All standard FM stereo broadcasts in the United States are accompanied by a 19 kc. pilot signal which is employed in the receiver to reconstruct a suppressed subcarrier signal of 38 kc. Accordingly, the pilot signal may be detected and used to identify stereo broadcasts.

Many radio receivers, particularly those designed for use in automobiles, are equipped with signal seeking tuners in which a motorized signal search device is manually actuated but automatically deactuated when the tuner encounters a broadcast of sufficient strength to operate a latch device.

The present invention involves an improvement to such stop-on-station receivers whereby accurate stopping of the tuner search mechanism on stereo signals may be assured. Moreover the invention permits selective operation of such tuner mechanisms to stop on either all FM stations of predetermined signal strength or on FM stereo stations only.

In general, the invention is carried out by effectively combining signals derived from a stereo broadcast to stop the search drive mechanism only when two signal conditions obtain. More specifically, a circuit responsive to the reception of the 19 kc. pilot signal presents a "conditioning" signal which permits the tuner search mechanism to be stopped upon contemporaneous presentation of a signal from a trigger detector which is controlled by the FM limiter stage. This combination of signals controls a trigger circuit to operate the tuner latch mechanism in such a fashion as to avoid spurious stopping of the tuning process on points other than substantially the center of a broadcasting station bandwidth.

Further features and advantages of the invention will become apparent from the following description of a specific embodiment of the invention together with the accompanying drawings of which:

Figure 1:
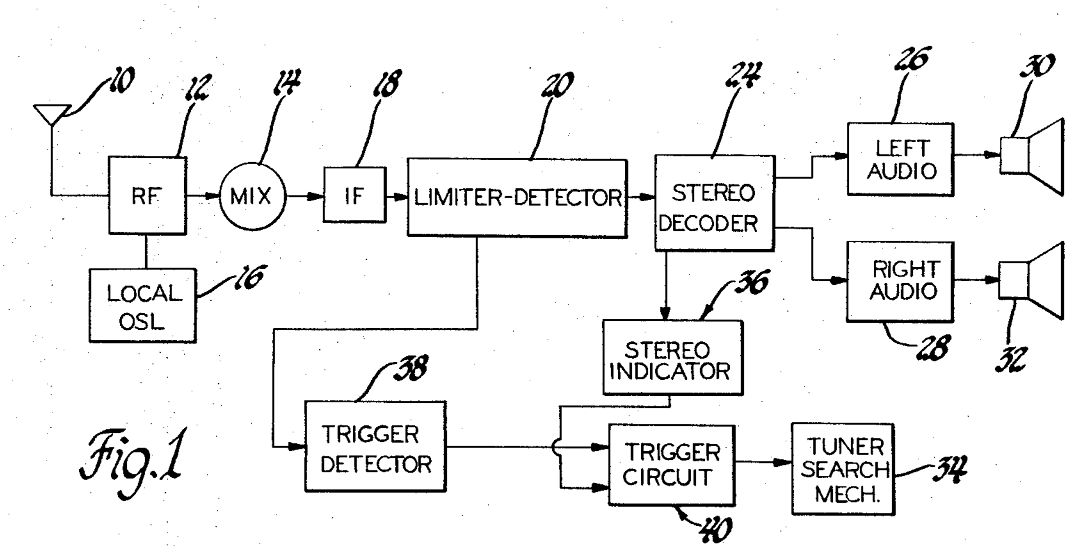
FIG. 1 shows in block diagram an FM receiver employing the invention.

FIG. 1 shows a radio receiver equipped to receive and demodulate FM broadcasts, both monaural and stereo. The receiver comprises an antenna connected to an RF amplifier stage 12 which in turn is connected to a mixer 14. Signals from a local oscillator 16 are also applied to the mixer 14 in the conventional fashion to produce an intermediate frequency signal which is amplified by IF amplifier 18. This signal is applied to a limiter-detector stage 20 which produces an output which varies in signal amplitude in accordance with the frequency variations of the input signal thereto. The output of limiter-detector 20 is connected to a stereo decoder 24 which adds and subtracts the conventional L+R and L−R signals to produce the left and right stereo outputs. These outputs are connected to left and right audio amplifiers 26 and 28 which in turn are connected to left and right speakers 30 and 32, respectively.

The receiver shown in FIG. 1 may be equipped with a signal seeking tuner search mechanism 34 of the type disclosed in the U.S. Pat. No. 2,751,503 to Schwartz. In this type of tuner mechanism a spring motor drives the tuner to continuously sweep across the FM band by moving iron slugs relative to inductive windings which are placed in the tuned circuit stages of the radio in conventional fashion. The tuner mechanism 34 is equipped with a latch device shown as 34A in FIG. 2 which stops the spring motor drive motion upon receipt of a broadcast signal of some predetermined strength. At the end of a sweep a solenoid recocks the spring drive in rapid fashion so that the frequency sweep may be again begun if desired. Since the details of the tuner search mechanism 34 and the latch 34A are well known in the art details thereof are omitted from this specification for brevity.

When tuned to a stereo broadcast, the FM stereo receiver shown in FIG. 1 receives, as a modulating tone on the FM carrier signal, a 19 kc. pilot signal. This pilot signal is characteristic of all FM stereo broadcasts in the United States. This signal is detected at 20 and decoded at 24 for the purpose of reconstructing the 38 kc. suppressed subcarrier which carries half of the stereo broadcast in conventional fashion. The 19 kc. pilot signal is also applied in many radios to a stereo indicator 36 which for example may be a lamp lighting circuit to indicate to the operator that a stereo broadcast is being received. This 19 kc. pilot signal is also employed as one of two signals which together permit the tuner search mechanism 34 to respond only to FM stereo broadcasts in a manner to be more specifically described.

Figure 3:
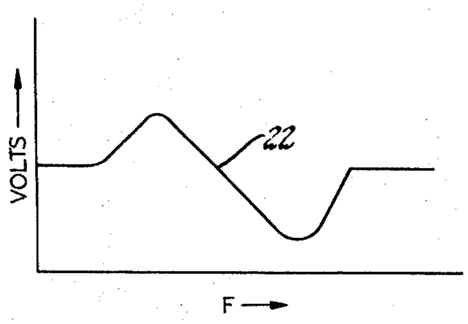
FIG. 3 is a graph showing a typical "S-curve" of an FM radio receiver detector.

The limiter detector state 20 of FIG. 1 produces an output which is represented by the typical FM receiver "S-curve" shown in FIG. 3. As FIG. 3 shows, the output of the limiter-detector stage 20 is a voltage which varies in amplitude in accordance with the variations in modulated frequency of the FM signal. The "S-curve" of FIG. 3 includes a substantially linear center section 22 bounded by high and low amplitude peaks which are preceded and followed respectively by shorter fairly linear portions. As is well known to those skilled in the art it is desirable to operate over the center linear portion 22 so as to realize the greatest frequency response to the incoming signal.

The output of the limiter-detector stage 20 is connected to a trigger detector circuit 38 which detects the change in voltage amplitude produced by the limiter portion of the limiter-detector 20 and applies a signal to the trigger circuit 40 which represents the receiver reception of an FM signal of sufficient strength to warrant the operation of a tuner latch mechanism 34A. However, in accordance with the invention the trigger circuit 40 is so constructed as to be operable to stop the tuning process only upon receipt of a signal from stereo indicator 36. If the two signals are applied to the trigger circuit 40, the trigger circuit 40 is operable to apply a signal to the tuner search mechanism 34 to stop the tuning process substantially in the center of the received signal bandwidth.

As is well appreciated by those skilled in the art, the signal strength of an FM broadcast as received varies FM stereo accordance with distance between the station and the receiver as well as the power level on which the station operates. To prevent variations in received signal strength from operating the tuner latch mechanism 34A at different points in relation to the center of the station's broadcasting bandwidth, the trigger detector circuit 38 is constructed in accordance with the disclosure in the U.S. Pat. No. 2,652,486 to Guyton. As this patent discloses various voltages may be effectively combined such that the output of the trigger-detector 38 functions to operate the tuner latch mechanism 34A at substantially the same point in relation to the center of a received signal bandwidth regardless of the strength of the input signal.

Figure 2:
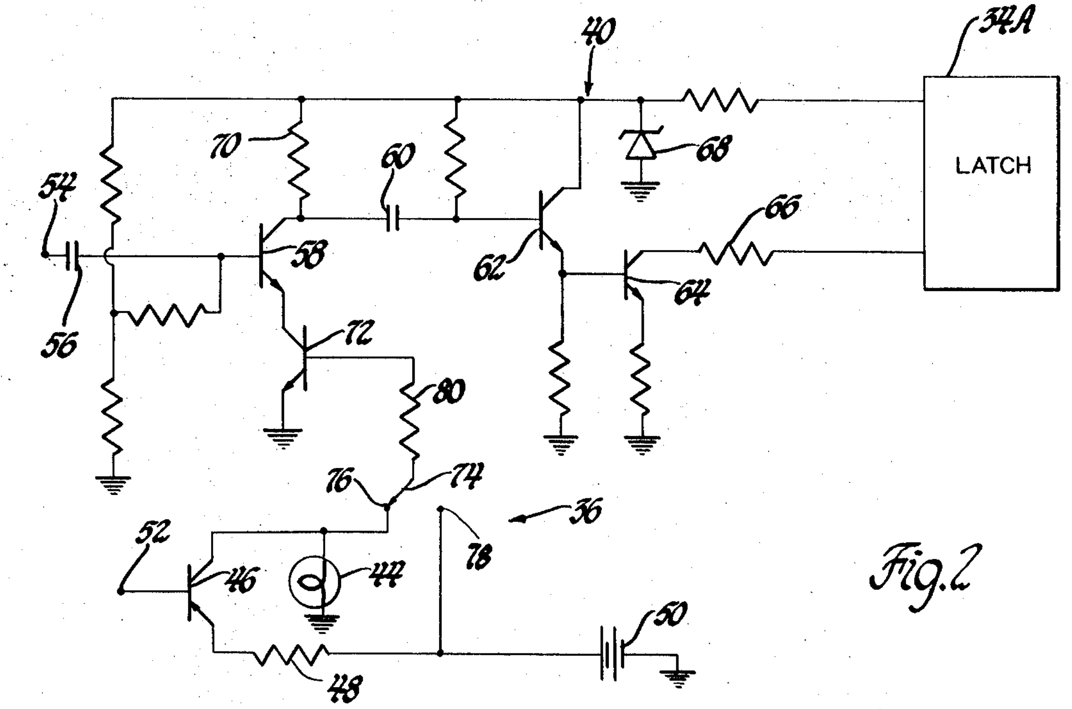
FIG. 2 shows in schematic detail the circuitry employed in a specific embodiment of the invention.

Referring now to FIG. 2 the stereo indicator 36 and trigger circuit 40 of FIG. 1 are shown in schematic circuit detail. The stereo indicator circuit 36 comprises a small indicator lamp 44 connected in series with the collector and emitter electrodes of a PNP transistor 46, a small current limiting resistor 48, and a DC supply source 50. The base electrode represents the input point 52 for the stereo indicator circuit 36 which receives the signal from the stereo decoder 24 indicating the receipt of a 19 kc. pilot signal. Upon application of a negative voltage input to point 52, transistor 46 becomes conductive permitting current from the source 50 to flow through the indicator lamp 44. Lamp 44 may be visible from the front of the radio receiver as viewed by the operator to indicate the reception of an FM stereo signal.

The trigger circuit 40 shown in FIG. 2 includes an input point 54 which represents the point of application of the tuner stop command from trigger circuit 38. This signal is coupled through a capacitor 56 to the base of a transistor 58. The collector of transistor 58 is coupled through capacitor 60 to the base of a transistor 62. This transistor is connected by way of the emitter electrode to the base of a third transistor 64 for signal amplification purposes. The collector of transistor 64 is connected through a relatively large resistor 66 to the tuner latch mechanism 34A which may include a relay to stop the tuner search process in the conventional fashion. The trigger circuit 40 also includes a voltage limiting diode 68 and various unnumbered resistors to provide the proper biases for the transistors 58, 62 and 64.

In general it may be observed that the application of a relatively positive voltage signal to the base of transistor 58 tends to render that transistor conductive. However, a current path to ground through resistor 70 and the emitter collector circuit of transistor 58 requires the conduction of an additional transistor 72, the collector of which is connected to the emitter of transistor 58 and the emitter of which is grounded as shown. Control of the conductivity of transistor 72 is accomplished by means of a switch having a moving contact 74 which may engage either of two stationary contacts 76 and 78.

If the movable contact 74 is connected to stationary contact 78 the DC voltage from source 50 is applied to the base of transistor 72 through resistor 80 such that transistor 72 is continuously in the conductive state. Accordingly, any signal applied to input 54 of trigger circuit 40 renders transistor 58 conductive and operates the tuner latch mechanism 34A. In this condition the trigger circuit 40 responds to all FM signal inputs of sufficient strength to produce an output from trigger detector 38.

When movable contact 74 is connected to stationary contact 76, however, a forward bias is applied to transistor 72 only upon the application of an input to point 52 rendering transistor 46 conductive. As previously described this situation obtains only upon reception of the 19 kc. pilot signal and application thereof to input point 52. Accordingly, in this condition the circuit responds only to stereo signal reception to operate the tuner latch mechanism 34A.

In summary, the embodiment of the invention shown in FIG. 2 permits the selection of either all FM stations, whether stereo or monaural, or alternatively the selection of only stereo stations. When the switch 74 is manipulated so that movable contact 74 is connected to stationary contact 76 the tuner latch mechanism 34A will be operated to stop the tuner search process only upon reception of both an FM detector signal and the 19 kc. pilot signal of which the detector signal is applied to input 54 and the pilot signal is applied to input 52. Because of slope detection techniques in FM radio detector circuitry, the application of the 19 kc. pilot signal to input point 52 precedes the application of the FM signal to trigger circuit input 54. Accordingly, the operation of latch mechanism 34A to stop only at the substantial center of an FM station band as described in the Guyton patent aforementioned is accomplished. Moreover, in radios having stereo indicator devices such as that shown at 36 in FIG. 1 the implementation of the present invention requires only the additional elements indicated by reference characters 72, 74, 76, 78 and 80 in FIG. 2.

It is to be understood that various modifications to the implementation of the present invention may be made without departing from the spirit and scope of the invention.

What I claim is:

1. In an FM stereo radio receiver having a tuner search mechanism for varying the reception frequency of the receiver until deactuated, detector means for producing a first signal in response to the reception of FM broadcast signals having a predetermined strength, decoder means for producing a second signal in response to the reception of FM stereo broadcast signals, voltage source means for continuously producing a third signal, a trigger circuit having a pair of inputs and an output, the output connected to the search mechanism for deactuating the search mechanism when signals are received at both inputs, means connecting one input to receive the first signal, and means for selectively connecting the other input to receive the second signal or the third signal, whereby the search mechanism may be selectively deactuated in response to all FM broadcast signals having the predetermined strength or only FM stereo broadcast signals having the predetermined strength.

2. In an FM stereo radio receiver having a tuner search mechanism for varying the reception frequency of the receiver until deactuated, a trigger circuit including first and second transistors connected in series for deactuating the search mechanism only when both the first and second transistors are biased conductive, detector means connected to the first transistor for biasing the first transistor conductive in response to the reception of FM broadcast signals having a predetermined strength, a DC power supply, a stereo indicator lamp, a third transistor connected between the power supply and the lamp for energizing the lamp from the power supply when rendered conductive, decoder means connected to the third transistor for biasing the third transistor conductive in response to the reception of FM stereo broadcast signals, and switching means selectively operable between first and second positions, the switching means connected between the second transistor and the power supply for biasing the second transistor conductive from the power supply when the switching means is in the first position, and the switching means connected between the second transistor and the third transistor for biasing the second transistor conductive from the power supply through the third transistor when the switching means is in the second position, whereby the search mechanism may be selectively deactuated in response to all FM broadcast signals having the predetermined strength or only FM stereo broadcast signals having the predetermined strength.